United States Patent [19]

Boddy et al.

[11] Patent Number: 5,703,732
[45] Date of Patent: Dec. 30, 1997

[54] EXTERIOR MIRROR WITH INDEXING AND CONTROL PIVOTING

[75] Inventors: Ian Boddy, Grand Rapids; Matthew D. Potts; Keith D. Foote, both of Kentwood; James Ruse, Allegan, all of Mich.

[73] Assignee: Lowell Engineering Corporation, Alto, Mich.

[21] Appl. No.: 729,405

[22] Filed: Oct. 11, 1996

Related U.S. Application Data

[63] Continuation-in-part of Ser. No. 612,068, Mar. 7, 1996, and Ser. No. 373,742, Jan. 17, 1995.

[51] Int. Cl.$^6$ .............................. G02B 5/08; G02B 7/182; B60R 1/06
[52] U.S. Cl. .................. 359/841; 359/872; 359/877; 248/479; 248/483; 248/549; 248/900; 318/445; 318/468
[58] Field of Search ................ 359/841, 872, 359/877; 248/549, 479, 483, 900; 318/445, 466, 468, 469, 484

[56] References Cited

U.S. PATENT DOCUMENTS

| | | | |
|---|---|---|---|
| 4,626,083 | 12/1986 | Nakayama et al. | 359/877 |
| 4,626,084 | 12/1986 | Kumai | 359/841 |
| 4,832,477 | 5/1989 | Torii et al. | 359/877 |
| 4,893,916 | 1/1990 | Sakuma et al. | 359/877 |
| 4,915,493 | 4/1990 | Fisher et al. | |
| 4,981,349 | 1/1991 | Tamiya et al. | 359/877 |
| 5,432,641 | 7/1995 | Mochizuki | 359/841 |
| 5,467,230 | 11/1995 | Boddy et al. | 359/877 |
| 5,477,390 | 12/1995 | Boddy et al. | 359/877 |
| 5,477,391 | 12/1995 | Boddy | |

FOREIGN PATENT DOCUMENTS 63-173745  7/1988  Japan.

*Primary Examiner*—Ricky D. Shafer
*Attorney, Agent, or Firm*—Cushman Darby & Cushman Intellectual Property Group of Pillsbury Madison & Sutro LLP

[57] ABSTRACT

A vehicle mirror assembly comprising a housing assembly, a mirror unit, a support assembly to support the housing assembly, a power operated pivot assembly between the support assembly and the housing assembly to enable the housing assembly to be pivoted with respect to the support assembly about a generally upright axis (1) between an operative position and a folded position in response to the power operation of the pivot assembly and (2) from the operative position thereof in either direction in response to an unwanted impact blow applied in either direction thereto. A spring biased pivotal control system is disposed between a movable tubular member of the pivot assembly and the support assembly to provide a control resistance to pivotal movement of the movable tubular member and hence the housing assembly connected thereto. A spring biased indexing system is disposed between a motion transmitting member and the movable tubular member to (1) transmit the movement of the motion transmitting member under power to the movable tubular member to thereby move the housing assembly between the operative and folded positions with the control system providing a control resistance and (2) allow the movable tubular member to be moved from the operative position relative to the motion transmitting member in response to an unwanted impact blow applied to the housing assembly in either direction to move the housing assembly from the operative position with the indexing system providing an indexing resistance to such movement which is independent of the control resistance.

21 Claims, 4 Drawing Sheets

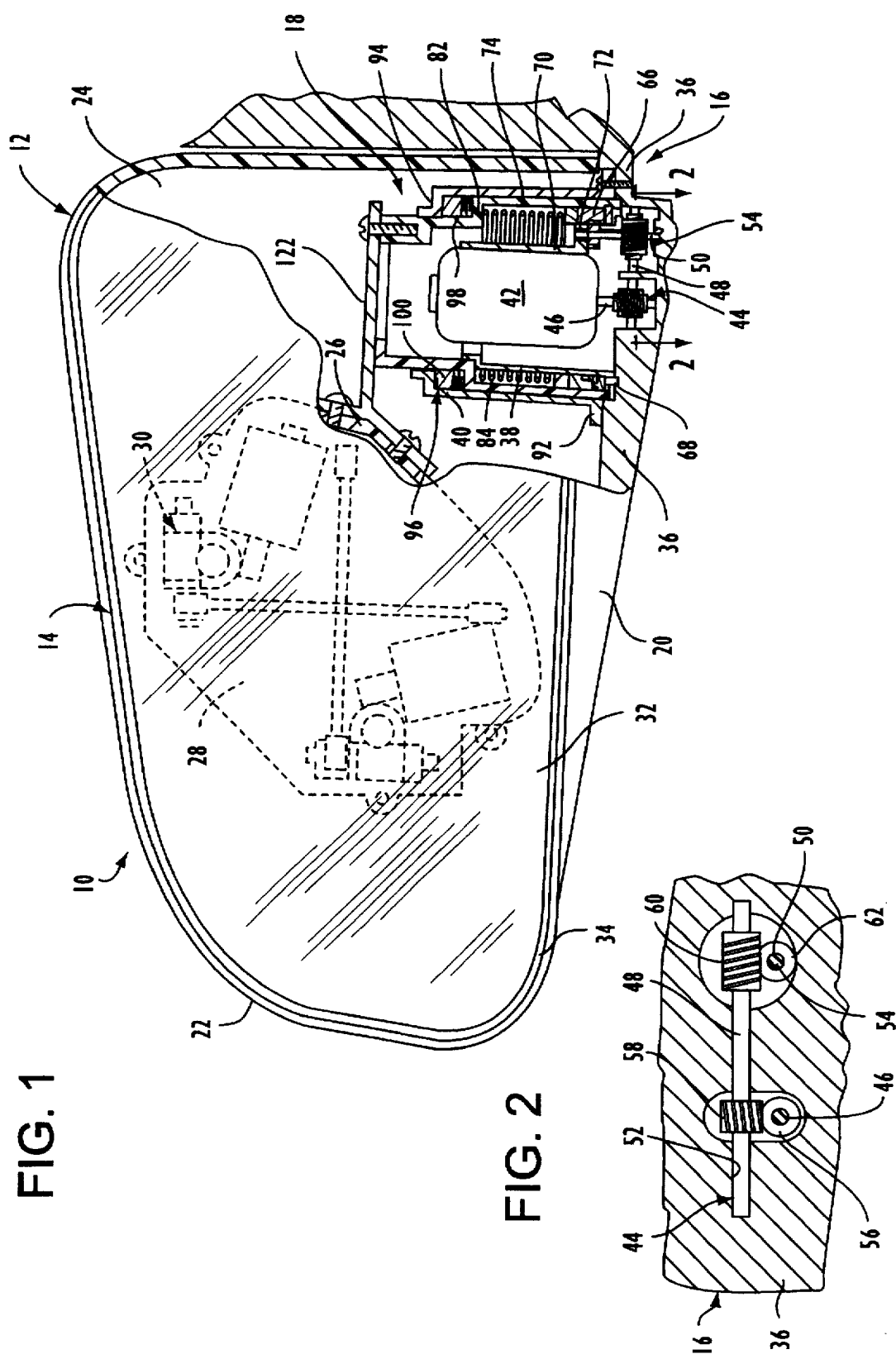

EXTERIOR MIRROR WITH INDEXING AND CONTROL PIVOTING

This application constitutes a continuation-in-part of U.S. patent application Ser. Nos. 08/612,068 and 08/373,742, filed Mar. 7, 1996 and Jan. 17, 1995, respectively for an exterior mirror with indexing and control pivoting and an exterior mirror with single pivot power fold, respectively.

The vehicle mirror assembly disclosed in both of the aforesaid applications is an exterior door mounted vehicle mirror assembly of the single pivot type capable of power movement in a rearward direction into a folded position and of impact force movement either into the rearward folded position or away from its operative position in a forward direction.

Many of the mirror assemblies of this type which have been proposed in the prior art have embodied an electrical motor for moving the mirror housing about the single pivot axis provided with respect to the fixed support between the normal operating or use position and a rear fold storage position. Typically, mirror assemblies of this type also provide the capability of enabling the housing assembly to be moved forwardly or rearwardly from the use position in response to an unwanted impact blow. When the housing assembly is moved into a forward fold position in most mirror assemblies proposed in the prior art, the electric motor is suitably controlled to enable the mirror housing to be returned into its normal position under power.

It will be understood that an essential function of a mirror assembly which has a movable housing assembly is that the mirror housing assembly must be stably retained in its use position. The typical manner in which stability is secured is to retain spring pressed balls in semi-spherical recesses in either the fixed support assembly or the movable housing assembly and to seat the retained balls within shortened semi-spherical recesses in the other assembly when the housing assembly is moved into the use position. This direct pivotal control system is in addition to the clutch or indexing system provided in the power train to enable non-powered movement to take place.

The seating of the spring pressed balls within the receiving recesses in order to provide the stability required also establishes a relatively high resistance to the movement of the mirror housing assembly from its use position toward its fold back position under power. This high resistance established the need for more powerful motors and the need to provide for position responsive controls for the motor.

Cost effectiveness is an essential characteristic of all automotive parts. Position sensitive controls increase assembly costs due to the necessity to precisely locate the position sensing elements in the assembly as compared with controls which are not position sensitive. For example, Japanese Patent Publication No. 63-173745 discloses a mirror assembly of the type described where the motor controls sense electrical changes in the current or voltage in the motor circuit, thereby eliminating the precise position location cost in assembling the assembly.

The '745 patent utilizes spring pressed balls rolling on surface configurations which provide less resistance to housing assembly movement from the use position to the rear fold position than from the use position to the forward fold position. Thus, instead of capturing the balls in short hemispherical recesses when the housing assembly is in the use position, the balls are captured between two angularly related surfaces, the ones which prevents movement of the balls toward the fold forward position having a very abrupt slope and the ones preventing movement of the balls toward the fold back position having a very slight slope.

The movement must be made less resistant in the direction toward the fold back position as compared to the direction toward the fold forward position in order for there to be a different current change which can be sensed to allow for stopping the movement when the housing assembly attempts to move beyond the use position toward the fold forward position when returned under power as compared with a power movement out of the use position toward the fold back position when no stoppage is desired.

U.S. Pat. No. 4,981,349 discloses a slight variation from the arrangement of the '745 patent wherein the slight slope in the rear fold direction is decreased a few degrees so as to have no slope whatsoever. The '349 patent discloses six different embodiments, all of which have in common that when the housing assembly is moved under power from the use position to the fold back position balls are spring biased to move along non-sloping surfaces. In all but the last embodiment, the sloping surfaces are the bottoms of recesses the ends of which define the use position and the fold back position.

In the first embodiment, when the housing assembly is moved beyond the use position into the fold forward position, the balls leave the bottom surfaces of the recesses and travel up the use position ends of the recesses onto an elevated horizontal land between adjacent ends of the recesses and then travel down the fold back position adjacent ends onto the bottom surfaces of the recesses again. When the motor is used to return the housing assembly from the fold forward position into the use position a reverse movement must be accomplished. When the fold back position ends of the recesses are encountered by the balls in the return movement, a current rise will occur. This current rise, if not equal to the current rise which occurs when the fold forward position ends are encountered by the balls in the normal movement of the housing assembly into the use position from the fold back position, will exceed that current rise as soon as the motor attempts to cause the balls to transerve the fold back position ends against the increasing spring bias. Consequently, in connection with this initial embodiment of the '349 patent relating to FIGS. 1–7, there is disclosed a position sensitive control system (FIG. 8). All of the remaining embodiments eliminate any peak resistances during the return movement from the full fold forward position and consequently broadly disclose the utilization of a motor circuit current rise sensor and a feed back from the sensor to a controller of the motor circuit power supply.

The '349 patent is silent as to just how the disclosed embodiments provide stability when the housing assembly is in its use position and is subjected to the bumps and vibrations which occur during the normal running of the vehicle. Direct resistance to movement of the housing assembly with respect to the support assembly out of the use position in a direction toward the fold forward position is provided by the spring pressed balls engaging the use position ends of the recesses. The only direct resistance in the opposite direction is the friction provided by the spring pressed balls engaging the non-sloping bottom surfaces of the recesses. Additional indirect resistance against movement of the housing assembly in both directions is provided by the ball clutch and its connection through the motion transmitting mechanism of the motor. However, the effectiveness of this resistance is subject to the back lash movement which exists in the gears of the motion transmitting assembly. The motion transmitting assembly includes a worm gear on the motor shaft which forms a part of a worm gear set. The remaining gears are meshing spur gears.

If it is assumed that all of the backlash in all of the gears is taken up when the housing assembly is moved under power into the use position from the fold back position, that is because of the bias provided by the motor against the resistance provided by the engagement of the balls with the use position ends of the recesses. When the bias of the motor is removed by being deenergized, the non-reversing action of the worm gear set is the only way that the indirect resistance to the movement of the housing assembly can be utilized as a stabilizing force to prevent slight movements within the limits provided by the back lash of the gears. Once the motor bias is eliminated by deenergization, the worm gear set must lock in reverse without any back lash in order to prevent any movement. If any back lash movement occurs before reverse locking, the friction provided by the spring pressed balls on the bottom surfaces of the recesses provides the major resistance to a slight movement of the housing assembly in a direction toward the fold back position. Even the allowance of a slight movement can create instability which can result in blurring the image in the mirror when it is needed in traffic.

The ability of the worm set to prevent the slight movements which can occur because of gear back lash are at best dependent upon the worm set being locked by a continuation of the bias on the spur gears made possible by the engagement of the balls with the use position ends of the recesses during power movement when the backlash was taken up. If the housing assembly is moved forwardly by an unwanted blow, the resistance of the gear train bias is lost and the locking bias of the worm set is likewise lost. Under these circumstances, a spring biased return after a slight unwanted forward movement will now allow the full back lash movement to come into play. This can be significant because the unwanted blow can occur while the vehicle is parked without the driver's knowledge so that when the driver returns and has gotten the vehicle in traffic in a situation where he needs the mirror, the instability may provide the driver with a blurred image.

It is an object of the present invention to overcome the stability problems noted above. In accordance with the principles of the present invention, this objective is achieved by providing a vehicle mirror assembly comprising a housing assembly, a mirror unit mounted on the housing assembly, and a support assembly constructed and arranged to be fixedly mounted on a vehicle and to support the housing assembly thereon in an operative position extending laterally outwardly from the vehicle so that the mirror unit serves as an exterior rear view mirror for the driver of the vehicle. A power operated pivot assembly is provided between the support assembly and the housing assembly constructed and arranged to enable the housing assembly to be pivoted with respect to the support assembly about a generally upright axis (1) between the operative position thereof and a folded position with respect to the vehicle in response to the power operation of the pivot assembly and (2) from the operative position thereof in either direction in response to an unwanted impact blow applied in either direction thereto. The power operated pivot assembly includes an electric motor and a non-self-reversing speed reduction motion transmitting assembly between an output shaft of the electric motor and the housing assembly. A spring biased pivotal control system is provided between the housing assembly and the support assembly constructed and arranged to provide a control resistance to pivotal movement of the housing assembly about the axis which control resistance (1) does not exceed a predetermined value when said housing assembly is moved in either direction between the operative and folded positions and (2) exceeds the predetermined value when the housing assembly is moved into the operative position in a direction away from said folded position and away from the operative position in response to an unwanted impact blow applied to the housing assembly in a direction away from the folded position. A spring biased indexing system is operatively associated with the motion transmitting assembly constructed and arranged to (1) transmit the movement of the motion transmitting assembly in response to a desired rotation of the motor shaft to the housing assembly to thereby move the housing assembly between the operative and folded positions with the spring pressed pivotal control system providing a control resistance to such movement which does not exceed the predetermined value in response to the desired rotation of the motor shaft and (2) allow the housing assembly to be moved from the operative position thereof relative to the electric motor in response to an unwanted impact blow applied to the housing assembly (1) in a direction to move the housing assembly from the operative position toward the folded position with the indexing system providing an indexing resistance to such movement which is independent of the control resistance provided by the control system and (2) in a direction to move said housing assembly beyond the operative position thereof away from said folded position with the indexing system providing an indexing resistance which is independent of the control resistance provided by the control system. The spring biased pivotal control system includes a movable control structure connected through the motion transmitting assembly and the spring biased indexing system to move with the housing assembly and a fixed control structure mounted in fixed relation with respect to the support assembly. The control structures provide control surfaces which interengage during a final incremental movement of the housing assembly by the electric motor into the operative position in a direction away from the folded position to thereby stress the spring biased pivotal control system and establish a control bias on the housing assembly to undertake a similar incremental movement in the opposite direction, the extent of the incremental movement being greater than the incremental movement permitted by the motion transmitting assembly through backlash. The spring biased pivotal control system enables the control bias provided thereby to stabilize the housing assembly when in the operative position (1) after having been moved therein by the electric motor in a direction away from the folded position and (2) when manually returned to the operative position after an unwanted impact blow movement therefrom.

Another object of the present invention is the provision of a mirror assembly of the type described which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

IN THE DRAWINGS

FIG. 1 is an elevational view of a vehicle mirror assembly embodying the principles of the present invention as viewed by looking forwardly at the lefthand side of the vehicle with the mirror assembly in its operative position, the mirror assembly being shown partly in section for purposes of clearer illustration;

FIG. 2 is an enlarged fragmentary sectional view taken along the line 2—2 of FIG. 1;

Figure 3:
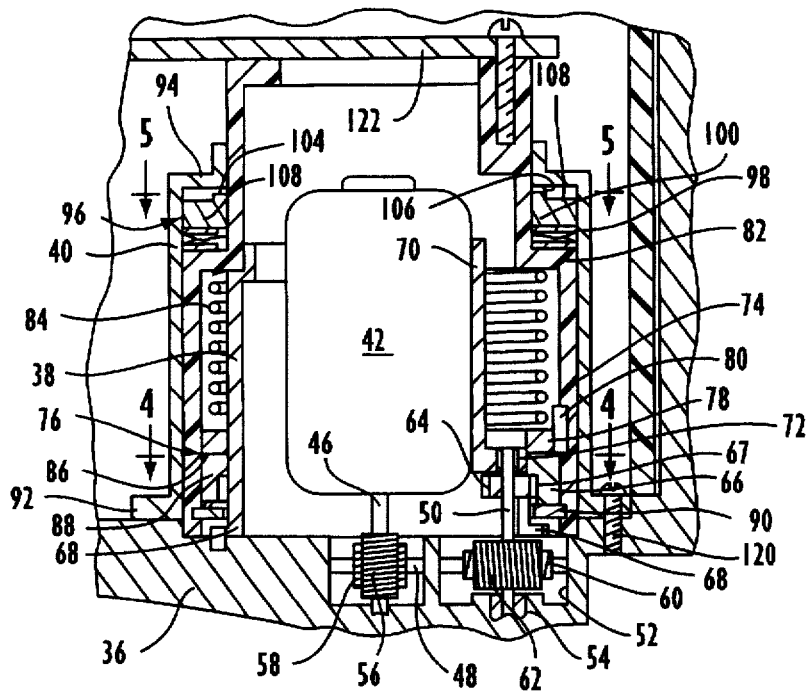
FIG. 3 is an enlarged cross-sectional view of the material shown in FIG. 1 in cross-section.

Referring now more particularly to the drawings, there is shown in FIG. 1 thereof, a vehicle mirror assembly, generally indicated at 10, which embodies the principles of the present invention. The vehicle mirror assembly 10 includes, in general, a housing assembly, generally indicated at 12, a mirror unit, generally indicated at 14, mounted on the housing assembly 12, a support assembly, generally indicated at 16, constructed and arranged to be fixedly mounted on a vehicle, and specifically a front door thereof, so that the mirror unit 14 serves as a rear view mirror for the driver of the vehicle, and a power operated pivot assembly, generally indicated at 18, between the support assembly 16 and the housing assembly 12 constructed and arranged to enable the housing assembly to be pivoted with respect to the support assembly about an upright axis (1) between the operative position thereof and a folded position with respect to the vehicle in response to the power operation of the power operated pivot assembly 18 and (2) from the operative position thereof in either direction in response to an unwanted impact blow applied in either direction thereto. The power operated pivot assembly 18 also permits the housing assembly 12 to move from the operative position thereof in either direction in response to a manual or impact force applied in either direction to the housing assembly 12.

The construction of the housing assembly 12 is dependent upon whether the mirror assembly 10 is to be attached to a passenger car type automotive vehicle or other type of automotive vehicle, such as a truck or the like. In the passenger car exemplary embodiment shown, the housing assembly 12 includes a molded plastic shell structure 20 providing a rearwardly disposed periphery 22 extending in surrounding relation to the mirror unit 14 and a front wall 24 which bulges forwardly in covering relation to the mirror unit 14.

The housing assembly 12, as shown, also includes a fixed casing member 26 which is fixed to the central portion of the front housing wall 24 or it may be molded as an integral part thereof. The fixed casing member 26 is constructed and arranged to mate with a cooperating casing member 28 which is detachably fixed thereto. Carried by and within the casing members 26 and 28 is a power operated adjusting mechanism, generally indicated at 30, which extends from the casing member 28 to the mirror unit 14. The adjusting mechanism 30 is constructed and arranged to move the mirror unit 14 in to any one of a multiplicity of adjusted positions with respect to the housing assembly 14. As shown, the adjusting mechanism 30 is constructed in accordance with the principles enunciated in commonly assigned copending U.S. Pat. No. 5,467,230, the disclosure of which is hereby incorporated by reference into the present specification. It will be understood that other known power operated mechanisms may be utilized, as, for example, the more conventional mechanism as disclosed in U.S. Pat. No. 4,915,493, the disclosure of which is hereby incorporated by reference into the present specification.

In the embodiment shown, the mirror unit 14 consists of a mirror 32 and a mirror holder 34 the forward portion of which includes mounting elements for the adjusting mechanism 30. The adjusting mechanism 30 need not be power operated but may be manually operated.

In the preferred embodiment shown, the support assembly 16 includes a rigid structure 36 which is fixed to the vehicle front door. If desired, the rigid structure 36 can be covered by a cover member (not shown) in accordance with the teachings of commonly assigned copending U.S. Pat. No. 5,477,391, the disclosure of which is hereby incorporated by reference into the present specification.

The power operated pivot assembly 18 is constructed in accordance with the principles of the present invention. The pivot assembly 18 is preferably made up of a series of components constructed and arranged to be assembled with respect to the fixed support structure 36 in a predetermined sequence of downward movements into a predetermined cooperating relation to one another. The components include a inner fixed tubular member 38 and an outer fixed tubular member 40 which are fixed to the fixed support structure 36 concentric with the upright pivotal axis provided by the pivot assembly 18, a reversible electric motor 42 disposed within the inner tubular member 38 and a speed reducing motion transmitting assembly, generally indicated at 44, between an output shaft 46 of the electric motor 42 and the housing assembly 12. The inner fixed tubular member 38 is preferably made of cast iron, steel or similar metal so as to constitute a flux yoke for the electric motor 42. The outer fixed tubular member is also preferably made of metal such as steel or the like.

As best shown in FIG. 2, the motion transmitting assembly 44 includes an elongated shaft 48 and a stub shaft 50 which are the first components to be assembled by downward movements into an upwardly opening bearing groove 52 and an upwardly opening bore 54 respectively formed in the fixed support structure 36. As shown, bore 54 is formed parallel with the pivotal axis to receive the lower end portion of the stub shaft 50 and the bearing groove 52 is formed in the fixed support structure 36 so that the elongated shaft 48 is journalled therein for rotation about an axis parallel to a plane passing through the axis of the stub shaft 50 and the pivotal axis provided by the pivot assembly 18.

The motion transmitting assembly 44 also includes a drive gear 56, which, as shown, preferably is either a worm gear fixed on the motor output shaft 46 and a driven gear 58 in the form of a worm wheel on the elongated shaft 48 disposed in meshing relation with the worm gear 56. Fixed on the elongated shaft 48 is a secondary drive gear 60, which also is preferably a worm gear. A secondary driven gear in the form of a worm wheel 62 is fixed on the stub shaft 50 in meshing relation with the secondary worm gear 60. Fixed to the stub shaft 50 above the gear 62 is a spur gear 64 which meshes with a ring gear 66 having teeth 67 on its interior periphery for meshing with the spur gear 64. Ring gear 66 rests on an exterior annular flange 68 formed on the lower end of the inner tubular member 38.

The speed reducing motion transmitting assembly 42 is a non-self-reversing assembly in the sense that the worm gear set 56–58 as well as the worm gear set 60–62 while capable of being driven in either direction by the reversible motor 42 will prevent movement in either direction in reverse toward the motor 42.

It will be understood that the bearing groove 52 for the elongated shaft 48 is enlarged in the area of the worm gear set 56–58 and worm gear set 60–62 and that the elongated shaft 48 and stub shaft 50 can be moved downwardly together during assembly or one after the other. In the preferred embodiment shown, the electric motor 42 is fixedly mounted within the inner tubular member 38 which is the next component to be assembled by moving an exterior flange 68 on the lower end thereof into engagement with the fixed support structure 36. The inner tubular member has an L-shaped wall portion 70 in one side thereof, the horizontal lug of which is apertured to receive a bearing 72 within which the upper end of the stub shaft 50 is journalled.

In order to positively prevent movement of the inner tubular member 38 about its axis which is concentric to the pivotal axis, the flange 68 may be suitably pinned to the fixed support structure 36 or otherwise prevented from turning about its axis. It will be understood that the inner tubular member 38 with the electric motor 42 fixed thereto must be assembled in such a way as to bring the worm gear 56 into meshing relation with the worm wheel 58. Moreover, since the motor 42 is fixed on the fixed support structure 36, suitable grooves (not shown) can be formed in the fixed support structure 36 to accommodate the electrical control wires (not shown) for the motor 42. Motor 42 does not fill the entire space within the inner tubular member 38 permitting other wires (not shown) for operating the motors of the power operating adjusting mechanism 30 to be fed from the fixed support structure 36 through the pivot assembly 18 by passing the motor 42 within the inner tubular member 38.

The ring gear 66 forms part of a sub-assembly which is mounted within a movable tubular member 74. The movable tubular member 74 is preferably molded of a suitable plastic material. The sub-assembly including the movable tubular member 74 may be regarded as a component of the power operated pivot assembly 18.

Figure 4:
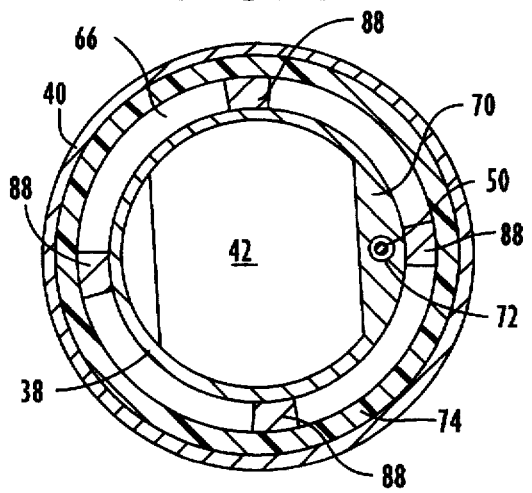
FIG. 4 is a sectional view taken along the line 4—4 of FIG. 3.
Figure 5:
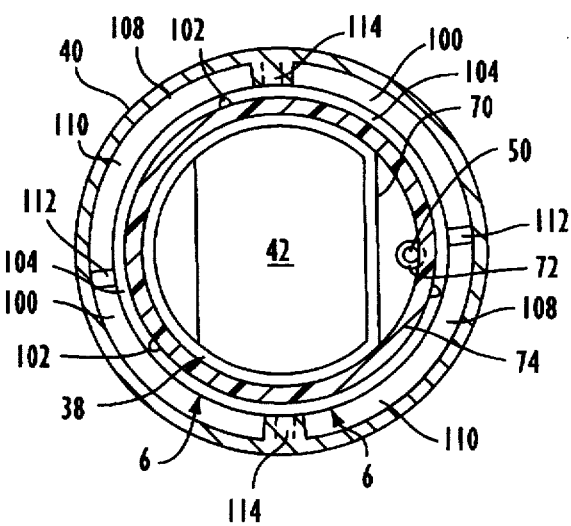
FIG. 5 is a sectional view taken along the line 5—5 of FIG. 3.

The sub-assembly includes a spring biased indexing system, generally indicated at 76, mounted between the ring gear 66 and the movable tubular member 74. As best shown in FIGS. 3 and 4, the indexing system 76 includes an indexing ring 78 which is keyed to the interior periphery of the movable tubular member 74, as by key elements 80, so that it can move axially with respect to the movable tubular member 74 but must move with the movable member 74 as it turns about its vertical axis. The movable tubular member 74 includes a radially extending portion 82 in its upper midsection which provides a downwardly facing surface on the interior periphery of the movable tubular member 74. A coil spring 84 for biasing the indexing system 76 has its upper end seated on the downwardly facing surface of the portion 82 and its lower end seated on the indexing ring 28. The indexing ring 78 has four annularly spaced downwardly opening recesses 86 formed therein, the arcuate extent of which are defined by opposite inclined surfaces. The ring gear 66 has four annularly spaced indexing projections 88 which are shaped to be received in the recesses 86. The sub-assembly consisting of the coil spring 84, the indexing ring 78, and the ring gear 66 are moved respectively into the interior periphery of the movable tubular member 74 and retained therein with the spring in stressed condition by a conventional C-clip 90.

The movable tubular member 74 with its contained sub-assembly is assembled next by being moved downwardly over the inner tubular member 38 to mesh the ring gear 66 with spur gear 64 until the lower end of the movable tubular member 74 rests on the fixed support structure 36.

The outer tubular member 40 is the last component of the pivot assembly 18 to be assembled. It is noted that the outer tubular member 40 has an exteriorly extended flange 92 at its lower end and an interiorly directed flange 94 at its upper end. The axial extent of the outer tubular member 40 is greater than the axial extent of the movable tubular member 74 below the radial portion 82 but less than the full axial extent thereof. The relative axial sizes are such that, when the outer tubular member 40 is assembled over the movable tubular member 74 with the lower flange 92 engaging the fixed structure 36, an annular space is left between the lower surface of the upper flange 94 and the upper surface of the radial portion 82. Within this annular space, a spring biased control system, generally indicated at 96, constructed in accordance with the principles of the present invention, is mounted.

As best shown in FIGS. 3 and 5–8, the spring biased control system 96 includes a biasing spring 98 in the form of a wavy ring of spring steel mounted over the upper periphery of the movable tubular member 74 until it is seated on the upper surface of the radial portion 82. The control system 96 also includes a control ring 100 which is mounted over the upper periphery of the movable tubular member until it is seated on the wavy ring spring 98. Control ring 100 is keyed to the upper exterior periphery of the movable tubular member 74 by key elements 102 so that it must move with the movable tubular member 74 when it turns about its axis but may have axial movement against the spring 98 with respect to the movable tubular member 74.

The control ring 100 constitutes a movable control structure which is connected through the motion transmitting assembly 44, and spring biased indexing system 76 to move with the housing assembly 12. The upper flange 94 of the outer tubular member 40 constitutes a fixed control structure which is fixed with respect to the support assembly 16.

As best shown in FIGS. 5–8, the control structures 94 and 100 provide interengaging control surfaces which may take any desired form capable of achieving the functions hereinafter specified. However, as shown, the control surfaces include a flat radially disposed inner upwardly facing annular surface 104 formed on the control ring 100 and a mating flat radially disposed inner downwardly facing annular surface 106 on the flange 94. It will be noted that the annular control surface 104 may be divided into discrete arcuate surface portions by the recesses provided which receive key elements 102. The control ring 100 includes a pair of annularly spaced relatively large arcuate projections 108 disposed outwardly of the annular control surface 104 thereof. The projections 108 define control surfaces which for each projection 108 include a flat radially disposed upwardly facing arcuate surface 110 having an inclined surface 112 extending downwardly and arcuately away from each end thereof.

The annular flange 94 includes a pair of annularly spaced relatively small arcuate projections 114 disposed outwardly of the annular control surface 106 thereof. The projections 114 define control surfaces which for each projection 114 includes a flat radially disposed downwardly facing arcuate surface 116 having an inclined surface 118 extending upwardly and arcuately away from each end thereof.

Final assembly of the pivot assembly 18 is completed by extending fasteners 120 through the lower flange 92 of the outer tubular member 40 and into the fixed structure 36. A bracket 122 serves to connect the upper end of the movable tubular member 74 with the casing portion 26 to complete the entire mirror assembly 10.

In accordance with the principles of the present invention, it is important that, when the mirror 10 is operated under the power of the motor 42 to move the housing assembly 14 between its use or normal viewing position and its rear fold position, the housing assembly 14 is stopped after the inclined surfaces 112 and 118 have engaged one another and undertaken an incremental relative sliding movement with respect to one another. This action is particularly important when the housing assembly 14 is moved into its use position under the power of the motor 42. In the preferred embodiment, a similar action is achieved when the housing assembly 14 is moved into its rear fold position under the power of the motor 42. However, this is not essential and it is possible to use a stop other than the interengagement of the inclined surfaces 112 and 118 to effect stoppage. The mirror assembly 10 can be provided with conventional interengaging abutments to determine the maximum rear fold position as well as the maximum forward fold position all in accordance with known practices. Also, in accordance with known practices, it is not contemplated that the housing assembly 14 will be moved from its normal viewing or use position forwardly toward its forward fold position under the power of the motor 42. Movement of this type is unwanted and is provided to accommodate the circumstance where the mirror housing is engaged by an impact blow or the like. The movement prevents a greater amount of damage than would be the case if no movement were allowed.

It is within the contemplation of the present invention to achieve the incremental inter-engagement between the inclined surfaces 112 and 118 by sensing an initial current rise in the control circuit for the electric motor 42 and utilizing the sensing as a signal for deenergizing the motor after a short predetermined time. Preferably, however, this function is achieved by choosing the inclinations of the inclined surfaces 112 and 118, the spring rate of the spring 98 and the electrical characteristics of the motor 42 together with the efficiency of the motion-transmitting assembly 44 to stall the motor 42 after the predetermined incremental relative movement has taken place.

Figure 6:
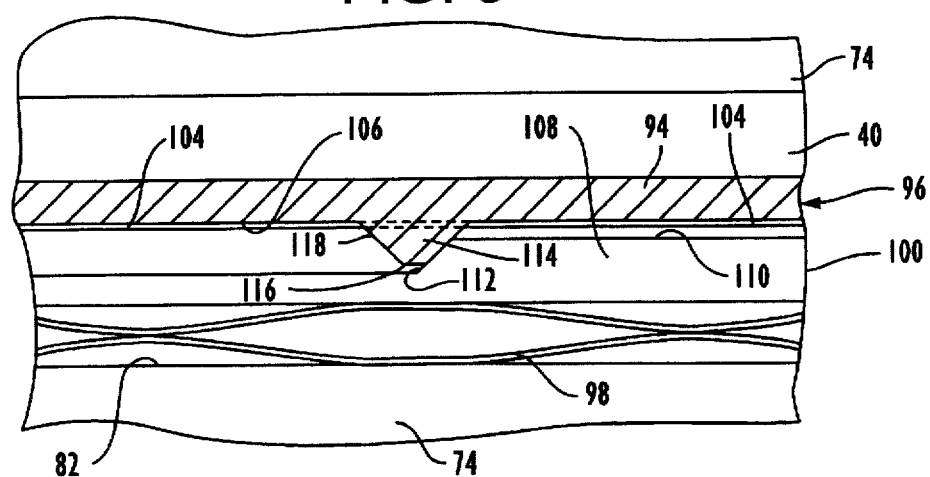
FIG. 6 is an enlarged fragmentary sectional view taken along the line 6—6 of FIG. 5.

In accordance with the principles of the present invention, the amount of incremental movement is chosen so that it is greater than the total backlash which is provided by the motion-transmitting assembly 44. As shown, the second worm gear set 60–62 will provide the lock against self-reversing movement so that the total backlash that must be accommodated is the backlash that will occur in the worm gear set 60–62 before reverse locking and the backlash that can occur between the spur gear 64 and the ring gear 66. In this way, the spring biased control system 96 provides for stability of the housing assembly 14 against movement when in the use position. The stability is provided directly in one direction by the interengagement of the projections 108 and 114. Movement in the opposite direction is prevented by the locked worm gear set 60–62. FIG. 6 shows the condition of the components of the spring biased control system 96 when the housing assembly 14 is in the use position. It will be noted that annular surfaces 104 and 106 are spaced apart slightly.

Figure 7:
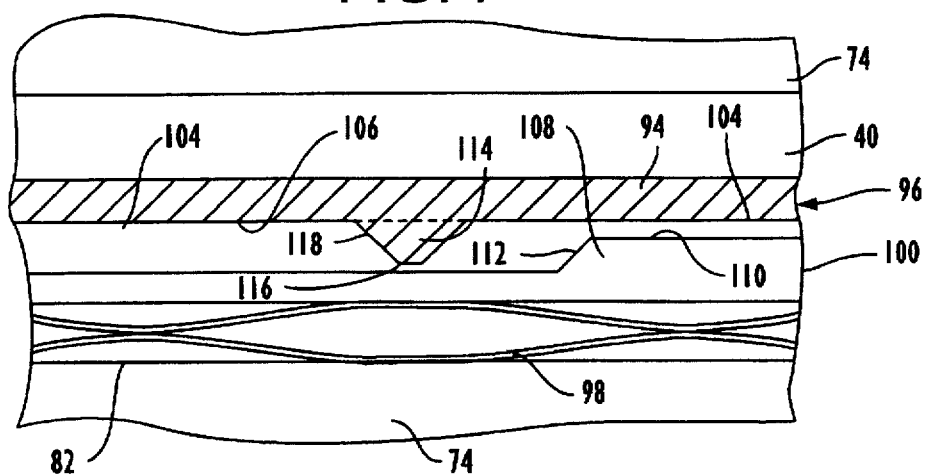
FIG. 7 is a view similar to FIG. 6 showing the position of the components during the movement of the housing assembly from the use position to the rear fold position.

When the motor 42 is energized to effect movement of the housing assembly 14 from the use position as shown in FIG. 6 to the rear fold position, the resistance which was previously provided by the motion-transmitting assembly 44 will of course be removed by virtue of its being driven in a direction away from its bias by the interengagement of the inclined surfaces 112 and 118 and the bias of spring 98. Consequently, the power movement away from the use position in a direction toward the rear fold position does not create any current rise in the motor circuit which would be sensed by the current rise sensor. As can be seen in FIG. 7, after an initial incremental movement, annular surfaces 104 and 106 interengage. During the subsequent movement toward the rear fold position, the annular surfaces 104 and 106 remain in interengagement and slide relative to one another. When the housing assembly 14 reaches the rear fold position, the opposite inclined surfaces 112 and 118 interengage with an incremental amount of relative movement before the motor 42 will stall. The stalling of the motor 42 causes a current rise which is sensed by the sensor in an electrical control circuit and, through the control circuit, the sensor is operable to deenergize the motor 42. When the reverse operation takes place, the same incremental sliding movement will take place between the inclined surfaces 112 and 118 until the motor 42 is stalled.

Figure 8:
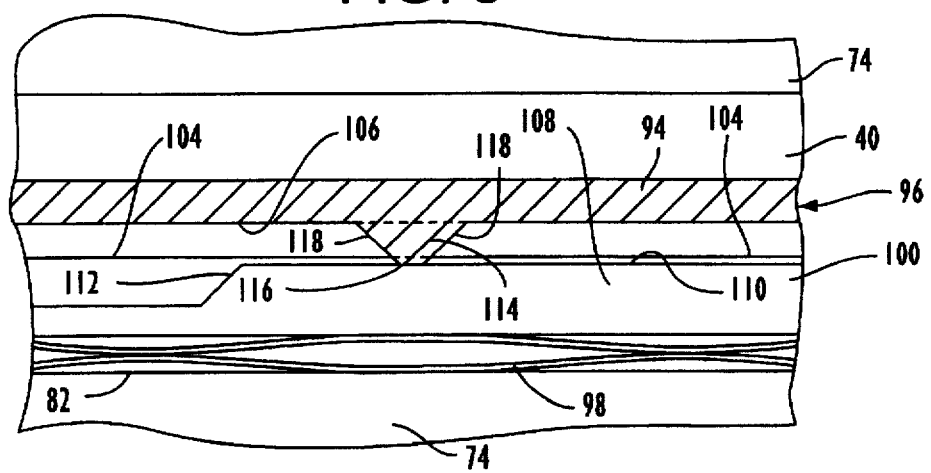
FIG. 8 is a view similar to FIG. 6 showing the position of the components during the movement of the housing assembly from the use position to the forward fold position.

When an unwanted impact blow is delivered to the housing assembly 14 in a direction to move the housing assembly 14 toward its forward fold position, the projections 108 will ride down on the projections 114 so that their surfaces 110 engage the surfaces 116 of the projections 114 as shown in FIG. 8. In order for this movement to take place, the spring biased indexing system 76 yields and overrides the motion transmitting assembly 44 which remains stationary. When this occurs, it can be seen that the reverse bias on the motion transmitting assembly 44 previously provided is relieved allowing the backlash between spur gear 64 and ring gear 66 and the worm gear set 60–62 to take place. If the unwanted movement is only a slight amount insufficient to disengage projections 108 and 114 of the control system 96 as well as the projections 88 from the recesses 86 of the indexing system 76, the housing assembly will be returned by the spring bias of the systems 96 and 76 to the use condition. Even if a backlash movement has taken place before the return, this movement will be less than the incremental movement provided between the surfaces 112 and 116 so that a spring bias will still be imposed upon the housing assembly 14 to ensure its stability.

If the unwanted movement is enough to move the control system components into the position shown in FIG. 8, when the impact force is removed, the housing assembly 14 will remain in the forward fold position into which it was moved. Return to the use position can be accomplished either manually or under the power of the motor 42. Manual movement will interengage the projections 88 and recesses 86 of the spring biased indexing system 76 and the projections 108 and 114 of the control system 96 in the manner previously described. Where power is utilized to effect the return movement, the motor 42 is energized to move the housing assembly 14 toward the use position. After the projections 88 and recesses 86 of the indexing system 76 have been interengaged, power movement is continued beyond the use position to the rear fold position. Thereafter, the housing assembly 14 is moved under power to the use position.

If an unwanted movement from the use position in a direction toward the rear fold position takes place, return can also be either manual or under power. Where the extent of the movement is insufficient to move the projections 88 out of the recesses 86, the strength of the spring 84 of the indexing system 76 is sufficient to effect the return and the incremental interengaged movement of the inclined surfaces 112 and 116. Where the movement is greater, a similar movement by the spring 84 at the end of the movement will occur. Power return is similar to a normal power movement into the use position except that a simultaneous movement of the projections 88 within recesses 86 occurs as the housing assembly 14 reaches the use position.

Figure 9:
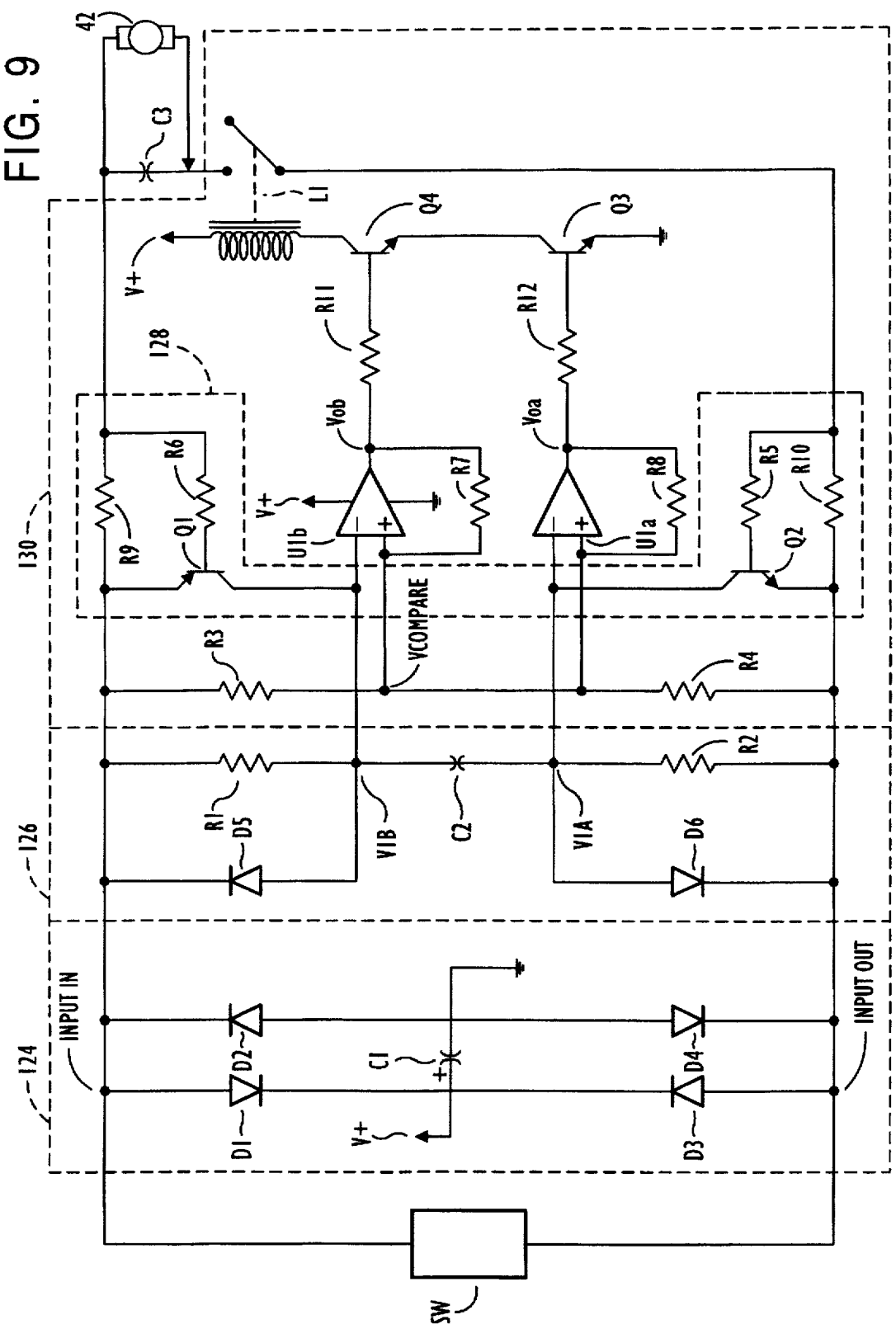
FIG. 9 is a schematic wiring diagram of the electrical control circuit.

Referring now more particularly to FIG. 9, there is shown therein an exemplary electrical circuit for energizing and deenergizing the motor 42 to accomplish the power functions noted above. As shown, the circuit 10 is comprised of a rectifier 124, a timer 126, a sensor 128, and a controller 130. The rectifier 124 is comprised of diodes D1–D4 and capacitor C1. The timer 126 is comprised of resistors R1, R2, diodes D5, D6 and capacitor C2. The sensor 128 is comprised of transistors Q1, Q2 and resistors R5, R6, R9, and R10. The controller 130 is comprised of comparators U1a, U1b, a voltage divider formed by resistors R3 and R4, resistors R11, R12, transistors Q3, Q4, and relay L1.

The rectifier 124 provides an output voltage V+ at a set polarity regardless of the polarity of the input voltages INPUT IN and INPUT OUT. A capacitor C1 holds the output voltage V+ steady when the input voltage polarity is switched.

Transistors Q1, Q2 are switches that turn on when their base to emitter voltage reach a turn on voltage. The resistors R9, R10 are power resistors in series with the motor 42. When the motor 42 stalls, resistors R9, R10 cause a voltage drop that exceeds the turn on voltage of transistors Q1 or Q2.

When transistors Q1 or Q2 of the sensor 128 are off, the RC timer circuit implemented by either resistor R1 and capacitor C2 or resistor R2 and capacitor C2 sets a turn off time by gradually filling capacitor C2 such that the voltage at either V1B or V1A rises above the reference voltage Vcompare of the voltage divider created by resistors R3, R4. When transistors Q1 or Q2 turn on, they bypass resistors R1 or R2, respectively, causing the rapid filling of capacitor C2. This rapid filling causes the voltage across capacitor C2 at either V1B or V1A to exceed the reference voltage Vcompare, thus turning off the comparator U1a or U1b, driving the corresponding output Voa or Vob low.

When the comparators U1a or U1b drive low, they turn off the respective transistors Q3 or Q4, thus turning off the relay coil of relay L1 which opens to shut-off the motor 42. The controller 130 latches in this state due to the holding of capacitor C2 even though transistors Q1 and Q2 are now off.

The capacitor C3 is merely an R.F.I. absorbing capacitor with good high frequency attenuation.

If a voltage is applied to the circuit with 12 volts at the INPUT IN terminal and ground at the INPUT OUT terminal, as by a control switch SW or the like, diode D5 becomes an open and diode D6 becomes a short, thus rendering resistor R2 ineffective. Resistor R1 and capacitor C2 begin an RC circuit, filling the capacitor C2 and causing the voltage at V1B to gradually rise up from ground. The resistors R2 and R4 set a "bias" or "compare" reference voltage Vcompare on the positive input terminals of comparators U1a and U1b. Initially, the voltage at V1B is lower than the reference voltage Vcompare. Therefore, at comparator U1b, the voltage at the positive input terminal is higher than the voltage at the negative input terminal. This causes the comparator U1b to turn on at Vob which then turns on transistor Q4. Concurrently, at comparator U1a, the voltage at the positive input terminal is higher than the voltage at the negative input terminal which has been pulled to ground by diode D6. This causes the comparator U1a to turn on at Voa which turns on transistor Q3; comparator U1a and transistor Q3 will remain on given this input polarity. The motor 42 is therefore turned on and operates in the direction corresponding to the polarity of the input at INPUT IN and INPUT OUT.

From this point, either the motor 42 will reach a stop (normally within 2 to 3 seconds) or a predetermined amount of time t will elapse without the motor 42 reaching a stop (e.g., 10 seconds).

If the motor 42 does not reach a stop within t seconds, at some time t the voltage at V1B will reach and exceed the reference voltage Vcompare. This causes the voltage at the negative input terminal of U1b to exceed the voltage at the positive input terminal of U1b, turning off the comparator U1b at output Vob. This turns off transistor Q4 which turns off relay L1 which then opens to turn-off the motor 42.

The motor 42 will stall if it reaches a stop at some time less than t. This causes the voltage at resistor R9 to drop down enough to turn on transistor Q1. Transistor Q1 then bypasses resistor R1, causing the capacitor C2 to rapidly fill and the voltage at V1B to rapidly rise above the reference voltage Vcompare. When the voltage at V1B exceeds the reference voltage Vcompare, the comparator U1b is turned off. This turns off transistor Q4 which turns off relay L1 which then opens to turn off the motor 42.

Upon changing the polarity of the input voltage at INPUT IN and INPUT OUT, as by the aforesaid switch, the circuit functions symmetrically with the motor 42 operating in the opposite direction.

Variations in the circuitry described above are contemplated. For example, the cessation of housing assembly movement at the use position is accomplished by stalling the motor and the circuit is used to deenergize the motor immediately after stalling occurs. While motor stalling is greatly preferred, other modes of deenergizing the electric motor can be used in place of the mode embodied in the above-described circuit. For example, a conventional off the shelf polythermal control device (PTC) can be utilized set to deenergize the motor circuit through a relay when a predetermined temperature is reached in the PTC based upon the current rise input to the PTC. Another deenergization mode contemplates the use of a timer to deenergize the motor after a predetermined time measured from the time that the movement of the housing assembly 14 toward the use position is initiated. In this case, the predetermined time would be chosen to be one or two seconds after the time when stall would be normally expected. This timer mode could also be used in conjunction with the PTC mode particularly as a back-up when low ambient temperatures may unduly extend the time for deenergization after motor stall because of the lag in temperature increase in the PTC. Moreover, other stalling modes can be utilized when the housing assembly 14 is being moved under power into the fold back position. For example, motor stall can be as a result of the solid interengagement of conventional limiting stops rather than an incremental sliding movement between inclined surfaces 112 and 118 creating a stalling resistance through the operation of the spring biased control assembly 96.

Any United States patent applications or patents mentioned or cited hereinabove are hereby incorporated by reference into the present specification.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A vehicle mirror assembly comprising
a housing assembly,
a mirror unit mounted on said housing assembly,
a support assembly constructed and arranged to be fixedly mounted on a vehicle and to support said housing assembly thereon in an operative position extending laterally outwardly from the vehicle so that said mirror unit serves as an exterior rear view mirror for the driver of the vehicle,
a power operated pivot assembly between said support assembly and said housing assembly constructed and arranged to enable said housing assembly to be pivoted with respect to said support assembly about a generally upright axis (1) between the operative position thereof and a folded position with respect to the vehicle in response to the power operation of said pivot assembly and (2) from the operative position thereof in either direction in response to an unwanted impact blow applied in either direction thereto,
said power operated pivot assembly including an electric motor and a non-self-reversing speed reduction motion transmitting assembly between an output shaft of said electric motor and said housing assembly,
a spring biased pivotal control system between said housing assembly and said support assembly constructed and arranged to provide a control resistance to pivotal movement of said housing assembly about said axis which control resistance (1) does not exceed a predetermined value when said housing assembly is moved in either direction between said operative and folded positions and (2) exceeds said predetermined value when said housing assembly is moved into said operative position in a direction away from said folded position and away from said operative position in response to an unwanted impact blow applied to said housing assembly in a direction away from said folded position and
a spring biased indexing system operatively associated with said motion transmitting assembly constructed and arranged to (1) transmit the movement of said motion transmitting assembly in response to a desired rotation of the motor shaft to said housing assembly to thereby move said housing assembly between said operative and folded positions with said spring biased pivotal control system providing a control resistance to such movement which does not exceed said predetermined value in response to the desired rotation of said motor shaft and (2) allow said housing assembly to be moved from the operative position thereof relative to said electric motor in response to an unwanted impact blow applied to said housing assembly (1) in a direction to move said housing assembly from said operative position toward said folded position with said indexing system providing an indexing resistance to such movement which is independent of the control resistance provided by said control system and (2) in a direction to move said housing assembly beyond the operative position thereof away from said folded position with said indexing system providing an indexing resistance which is independent of the control resistance provided by said control system,
said spring biased pivotal control system including a movable control structure connected through said motion transmitting assembly and said spring biased indexing system to move with said housing assembly and a fixed control structure mounted in fixed relation with respect to said support assembly,
said control structures providing control surfaces which interengage during a final incremental movement of said housing assembly by said electric motor into said operative position in a direction away from said folded position to thereby stress the spring biased pivotal control system and establish a control bias on said housing assembly to undertake a similar incremental movement in the opposite direction, the extent of said incremental movement being greater than the incremental movement permitted by said motion transmitting assembly through backlash, said spring biased pivotal control system being constructed and arranged to enable the control bias provided thereby to stabilize said housing assembly when in said operative position (1) after having been moved therein by said electric motor in a direction away from said folded position and (2) when manually returned to said operative position after an unwanted impact blow movement therefrom.

2. A vehicle mirror assembly as defined in claim 1 wherein said spring biased pivotal control system includes an electrical circuit for said electric motor, a sensor in said electrical circuit constructed and arranged to sense a predetermined current rise therein resulting from said housing assembly meeting a resistance which exceeds said predetermined value during said movement of the housing assembly into said operative position and a controller in said electrical circuit constructed and arranged to deenergize said electric motor in response to said sensor sensing the predetermined current rise.

3. A vehicle mirror assembly as defined in claim 2 wherein said predetermined current rise is approximately 1.5 amps.

4. A vehicle mirror assembly as defined in claim 3 wherein said spring biased pivotal control system and said electric motor are constructed and arranged to enable said electric motor to stall after said final incremental movement with said control surfaces interengaged has occurred.

5. A vehicle mirror assembly as defined in claim 4 wherein said electric circuit includes a safety timer constructed and arranged to deenergize said electric motor a predetermined time after said electric motor has been energized.

6. A vehicle mirror assembly as defined in claim 5 wherein said predetermined time is approximately ten seconds.

7. A vehicle mirror assembly as defined in claim 1 wherein said power operated pivot assembly includes a fixed inner tubular member fixed to said support assembly within which said electric motor is housed, said fixed inner tubular member being formed of a metal so as to serve as a flux yoke for the electric motor housed therein.

8. A vehicle mirror assembly as defined in claim 7 wherein said power operated pivot assembly includes a fixed outer tubular member fixed to said support assembly and a movable tubular member mounted between said fixed inner and outer tubular members, said movable tubular member having an upper end portion extending upwardly through an opening in an upper end of said fixed outer tubular member and fixedly connected to said housing assembly.

9. A vehicle mirror assembly as defined in claim 8 wherein said fixed outer tubular member includes a downwardly facing annular surface and a plurality of annularly spaced fixed projections having arcuate extents defined by opposite inclined surfaces and downwardly facing surfaces extending between opposite inclined surfaces, said control structure including an upwardly facing annular surface and a plurality of annularly spaced movable projections having arcuate extents greater than said fixed projections defined by opposite inclined surfaces and upwardly facing surfaces extending between opposite inclined surfaces, said annular surfaces being constructed and arranged to slidably interengage one another when said housing assembly is moved between the operative and folded positions thereof, one inclined surface of each of said fixed projections incrementally slidably interengaging one inclined surface of each movable projection when said housing assembly is moved into said operative position in a direction away from said folded position.

10. A vehicle mirror assembly as defined in claim 9 wherein another inclined surface of each fixed projection incrementally slidably interengages another inclined surface of each movable projection when said housing assembly is moved into said folded position in a direction away from said operative position, the upwardly facing surfaces of said movable projections engaging the downwardly facing surfaces of said fixed projections when said housing assembly has moved away from the operative position thereof in a direction away from the folded position after the interengaged inclined surfaces of said fixed and movable projections have moved in sliding relation to one another out of engagement with one another.

11. A vehicle mirror assembly as defined in claim 10 wherein said motion transmitting member comprises a ring gear positioned concentrically with said axis and mounted for rotational movement about said axis with respect to said movable tubular member.

12. A vehicle mirror assembly as defined in claim 11 wherein said spring biased indexing system includes indexing structure movably carried by one of said movable tubular member and said ring gear, said indexing structure being spring biased to engage another one of said movable tubular member and said ring gear.

13. A vehicle mirror assembly as defined in claim 12 wherein said indexing structure comprises an indexing ring mounted on an interior periphery of said movable tubular member for pivotal movement therewith and axial movement with respect thereto, said indexing ring being spring biased by a compression coil spring surrounded by said movable tubular member between said indexing ring and a generally radially outwardly extending surface formed in the interior periphery of said movable tubular member.

14. A vehicle mirror assembly as defined in claim 13 wherein said ring gear includes teeth on the interior periphery thereof and a plurality of annularly spaced indexing projections extending upwardly therefrom, said indexing ring including a plurality of annularly spaced recesses for receiving said projections, said recesses being interconnected with surfaces for slidably engaging said projections when not received in said recesses.

15. A vehicle mirror assembly as defined in claim 14 wherein said speed reduction motion transmitting assembly includes a stub shaft mounted between said support assembly and a lower end portion of said inner fixed tubular member for rotation about an axis parallel with said upright axis and an elongated shaft mounted with respect to said support assembly for rotation about an axis disposed within a plane perpendicular to the plane passing through the parallel axes, a first spiral gear fixed to said output shaft in meshing relation with a first cooperating gear fixed to said elongated shaft, a second spiral gear fixed to said elongated shaft in meshing relation with a second cooperating gear on said stub shaft and a drive gear fixed to said stub shaft in meshing relation with said ring gear.

16. A vehicle mirror assembly as defined in claim 1 wherein said power operated pivot assembly includes an inner fixed tubular member within which said electric motor is fixedly housed, said inner fixed tubular member being fixed to said support assembly, said electric motor being constructed and arranged to be operated by electrical power in a manner to generate flux for which said fixed inner tubular member constitutes a flux yoke.

17. A vehicle mirror assembly as defined in claim 1 wherein said motion transmitting assembly comprises a ring gear positioned concentrically with said axis and mounted for rotational movement about said axis with respect to a movable tubular member fixed to said housing assembly.

18. A vehicle mirror assembly as defined in claim 17 wherein said spring biased indexing system includes indexing structure movably carried by one of said movable tubular member and said ring gear, said indexing structure being spring biased to engage another one of said movable tubular member and said ring gear.

19. A vehicle mirror assembly as defined in claim 17 wherein said indexing structure comprises an indexing ring mounted on an interior periphery of said movable tubular member for pivotal movement therewith and axial movement with respect thereto, said indexing ring being spring biased by a compression coil spring surrounded by said movable tubular member between said indexing ring and a generally radially outwardly extending surface formed in the interior periphery of said movable tubular member.

20. A vehicle mirror assembly as defined in claim 19 wherein said ring gear includes teeth on the interior periphery thereof and a plurality of annularly spaced indexing projections extending upwardly therefrom, said indexing ring including a plurality of annularly spaced recesses for receiving said projections, said recesses being interconnected with surfaces for slidably engaging said projections when not received in said recesses.

21. A vehicle mirror assembly as defined in claim 17 wherein said speed reduction motion transmitting assembly includes a stub shaft mounted between said support assembly and a lower end portion of an inner fixed tubular member fixed to said support assembly, said stub shaft being constructed and arranged to rotate about an axis parallel with said upright axis and an elongated shaft mounted with respect to said support assembly for rotation about an axis disposed within a plane perpendicular to the plane passing through the parallel axes, a first worm gear fixed to said output shaft in meshing relation with a first cooperating gear fixed to said elongated shaft, a second worm gear fixed to said elongated shaft in meshing relation with a second cooperating gear on said stub shaft and a drive gear fixed to said stub shaft in meshing relation with said ring gear.

* * * * *

UNITED STATES PATENT AND TRADEMARK OFFICE
CERTIFICATE OF CORRECTION

PATENT NO. : 5,703,732
DATED : December 30, 1997
INVENTOR(S) : BODDY et al.

It is certified that error appears in the above-identified patent and that said Letters Patent is hereby corrected as shown below:

Column 5, line 66, "14" should be --12--;

Column 6, line 66, "42" should be --44--;

Column 7, line 55, "28" should be --78--;

Column 10, line 66, "116" should be --118--; and

Column 11, line 52, "R2" should be --R3--.

Signed and Sealed this

Ninth Day of March, 1999

Attest:

Q. TODD DICKINSON

*Attesting Officer*  *Acting Commissioner of Patents and Trademarks*